UNITED STATES PATENT OFFICE.

THOMAS MACFARLANE, OF MONTREAL, QUEBEC, CANADA, ASSIGNOR OF ONE-HALF TO A. RAMSAY, OF SAME PLACE.

PROCESS OF MAKING ZINC SULPHIDE ANHYDROUS.

SPECIFICATION forming part of Letters Patent No. 296,858, dated April 15, 1884.

Application filed August 24, 1883. (No specimens.)

*To all whom it may concern:*

Be it known that I, THOMAS MACFARLANE, of Montreal, in the Province of Quebec and Dominion of Canada, have invented certain new and useful Improvements in the Manufacture of Anhydrous Zinc Sulphides; and I do hereby declare that the following is a full, clear, and exact description of my invention, which will enable others skilled in the art to which it appertains to make and use the same.

This invention consists in mingling zinc chloride with hydrated zinc sulphide, for the purpose of excluding air while it is being ignited or rendered anhydrous and converted into a valuable pigment.

I take a solution of pure sulphate of zinc and mix it with that of any alkaline hydrosulphide, thereby forming a precipitate of hydrated zinc sulphide, which, after washing, filtering, pressing, and drying, I moisten with a solution of zinc chloride, again dry it, and ignite it in the manner hereinafter to be described; or I prepare a solution of pure zinc chloride of specific gravity 1.35 by dissolving zinc, oxide of zinc, or substances containing the latter in hydrochloric acid, and mix it with a solution of barium sulphide of specific gravity 1.060 until nearly the whole but not all of the zinc is precipitated as sulphide. The latter is then separated from the supernatant solution by subsidence or filtration, pressed but not washed, so as to leave in it a small quantity of the undecomposed chloride of zinc. This hydrated sulphide of zinc is ignited in the manner hereinafter to be described. The solution from the precipitation, which contains principally chloride of barium, is concentrated by evaporation to about one-half its original bulk. Strong sulphuric acid is then added to it in lead-lined tanks until a precipitate of sulphate of baryta is no longer produced. After the latter has subsided the liquid, which is a solution of hydrochloric acid, is drawn off and used for preparing fresh quantities of zinc chloride. The precipitated sulphate of baryta is filtered, washed, and sold as "permanent white" or "blanc fixé;" or I take hydrated sulphide of zinc prepared by any other process than those described above, either alone or mixed with other substances, and moisten it with a solution of chloride of zinc, and then dry and ignite it in the manner yet to be described.

The hydrated sulphide of zinc, either alone or mixed with other substances, prepared in any of the ways above indicated, and containing more or less chloride of zinc, is exposed on the hearth of a reverberatory or muffle furnace to a red heat, said heat being equally distributed through the charge by constant stirring. As soon as the charge has attained a red heat and fumes of zinc chloride begin to be given off, the charge is withdrawn from the furnace into water, when it is found to consist of a white pigment of great covering-power or "body." During this ignition the zinc chloride, as it is given off, prevents the access of air to the sulphide of zinc and preserves it from oxidation.

I am aware that it has been proposed to produce sulphide of zinc for use as a pigment by processes similar to those above described; but great difficulty has been experienced in igniting the sulphide without oxidizing it, and so causing discoloration and loss of body. I do not, therefore, claim the production of hydrated sulphide of zinc by the processes above described; but What I do claim, and desire to secure by Letters Patent, is—

The method of rendering hydrated sulphide of zinc anhydrous, which consists in heating said hydrated sulphide of zinc to redness in the presence of chloride of zinc, whereby access of air and oxidation are prevented by the fumes of the chloride of zinc, and discoloration and loss of covering-power are avoided, substantially as set forth.

THOMAS MACFARLANE.

Witnesses:
FREDERICK BATES,
N. W. BROWN.